Aug. 11, 1953

G. E. ROWE 2,648,168

SUCTION SETTLE AND COUNTERBLOWING
PROCESS AND APPARATUS
Filed Nov. 10, 1950

INVENTOR
GEORGE E. ROWE

BY Parham + Bates
ATTORNEYS

Patented Aug. 11, 1953

2,648,168

UNITED STATES PATENT OFFICE 2,648,168

SUCTION SETTLE AND COUNTERBLOWING PROCESS AND APPARATUS

George E. Rowe, Wethersfield, Conn., assignor to Emhart Manufacturing Company, a corporation of Delaware Application November 10, 1950, Serial No. 195,012

6 Claims. (Cl. 49—69)

The present invention relates to the manufacture of hollow glass articles, and more particularly to process and apparatus by means of which bottles and the like may be formed rapidly and advantageously while, at the same time, reducing such common defects as settle waves and chokes.

A general object of the present invention is to provide process and apparatus by means of which a charge is drawn and held in intimate contact with a neck mold by suction-settle while the charge is maintained out of contact with the tip of a hollow-ended neck pin and partially counterblown by a bubble of captured or introduced air and immediately thereafter is further counterblown into intimate contact with the forming mold substantially concurrently with the suction-settle operation.

It is recognized that undesirable "settle wave" has been substantially reduced heretofore by providing a hollow ended neck pin or plunger within a quantity of gas opposed settleblowing pressure and kept the glass charge out of surface contact with the neck pin prior to counterblowing.

Figure 1:
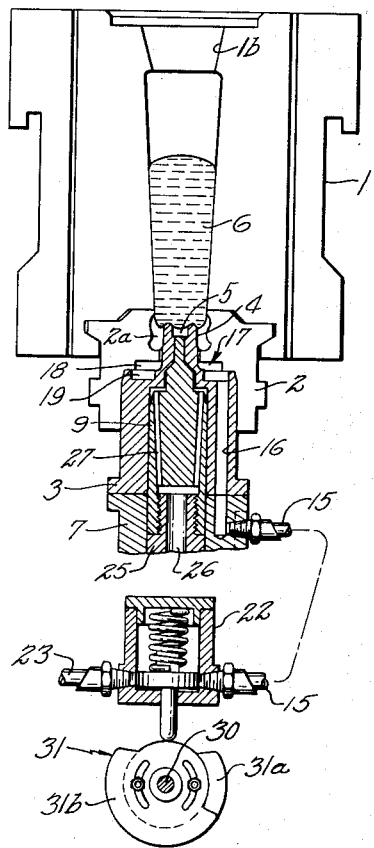
Figure 2:
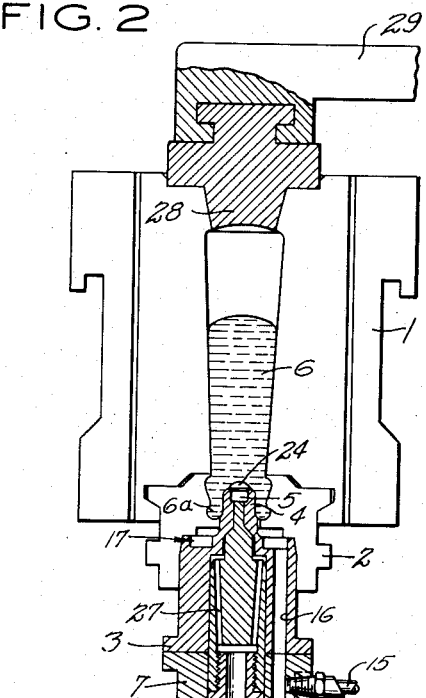
Figure 3:
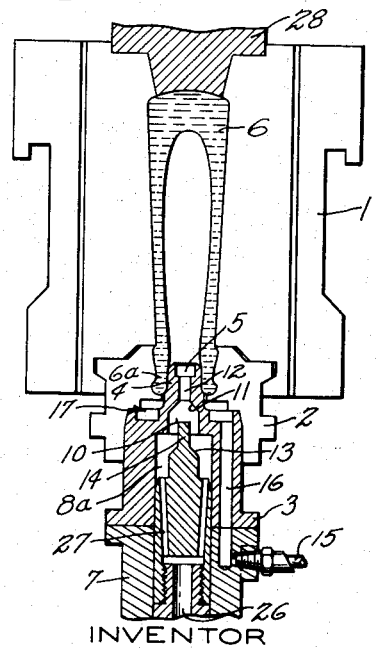

However, it is believed that applicant is the first to conceive the hollow neck pin operation in combination with suction settle and the invention recited in the appended claims and described in the following specification with reference to the accompanying drawings, in which:

Figures 1 to 3, inclusive, are somewhat schematic views in vertical section of apparatus and its mode of operation in forming glass articles, such as bottles, parisons or preforms in accordance with the present invention, Fig. 1 showing the charging of the mold; Fig. 2, the introduction of a baffle plate and settling of the charge in the mold by suction settle; and Fig. 3, the counterblowing of the charge in the blank mold while maintaining suction-settle; and Fig. 4 is an enlarged view of a portion of the neck pin and suction-settle mechanism illustrated in Fig. 2.

While the illustrated apparatus embodying the present invention may be incorporated in many types of forming machines, the present drawings show it adapted to the now well-known "Hartford I. S. Machine" which is disclosed in considerable detail in the patent to Ingle No. 1,911,119, granted May 23, 1933. Only those portions of the Hartford I. S. machine are illustrated here, which are necessary to show its adaptation to the construction and performance of the present invention. Reference may be made to the Ingle patent for a disclosure of the remainder of the machine and for a detailed disclosure of the construction and operation of certain of the parts, which will be only generally described herein.

Referring to the accompanying drawing, there is shown a conventional I. S. type multi-section inverted blank mold 1 at the bottom of which is a divided neck ring mold 2. Molds 1 and 2 both may be mounted and operated in the same manner as disclosed in the Ingle patent.

Figure 4:
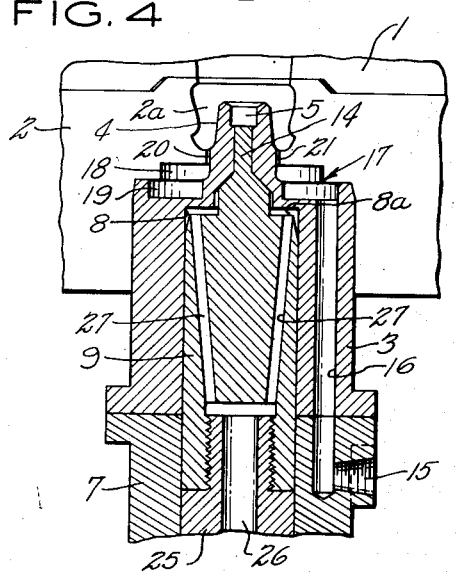

Associated with the lower end of the neck ring mold 2 and best illustrated in Fig. 4 is a neck pin structure 3 having a neck pin portion 4 at its upper end. The upper end of the neck pin portion 4 is formed with a reentrant cavity 5 which, as shown in Fig. 1, serves to trap a volume of air once a glass charge 6 is deposited in and drops downwardly through the mold 1 into the neck mold 2 where it is supported on the peripheral part of the neck pin bounding the depression or cavity 5.

The neck pin structure 3 is mounted for vertical reciprocal movement upon the upper end of an annular substantially cylindrical member or sleeve 7 to which it may be secured by suitable fasteners as, for example, split rings (not shown). The sleeve 7 may be provided at its lower end with a piston portion or other suitable force means for effecting the vertical reciprocation of the neck pin structure 3 and the neck pin portion 4 into and out of cooperative relation with the neck ring mold 2. It will be apparent that as the sleeve 7 is moved upwardly it raises the structure 3 so as to position the neck pin portion 4 in its operative or corkage molding position with respect to the neck ring mold 2.

Centrally formed in the neck pin structure 3 and operating sleeve 7 is a cylindrical guideway 8 in which a member 9 is slidably supported for vertical movement. The cavity 5 in the upper end of the neck pin 4 communicates with a counter-blowing air chamber portion 8a of the guideway 8, above the member 9, through a passageway generally designated 10 having a conical shoulder 11 and an upper bore 12 of reduced diameter which, respectively, are adapted to receive a conforming conical shoulder portion 13 and an upwardly extending stem portion 14 that projects from the upper end of the member 9. When the latter is moved upwardly to the position shown in Figs. 1, 2 and 4, the shoulder 13 seats tightly against the conforming shoulder 11 and the stem 14 fills the bore 12 so as to provide a bottom for the neck pin cavity 5 which closes the passageway 10 and prevents communication between the cavities 5 and 27.

In accordance with the present invention, suction preferably is employed to settle the glass charge 6 in the neck mold cavity 2a. In the illustrated embodiment, a suction line 15 communicates with the neck mold cavity 2a through a bore 16 in the members 3 and 7 and through a suction chamber 17 which, when the member 3 is in the upper or mold engaging position, is formed by recesses 18 and 19, respectively, in the neck mold 2 and the member 3. The suction chamber 17, in turn, communicates with the cavity 2a through a thin annular passage 20 between the pin 4 and a bore 21 of slightly larger diameter than the neck pin 4. Thus, when the line 15 is connected, as by means of spring loaded and cam actuated valve 22, to a source of subatmospheric pressure or suction, such as may be continually maintained in line 23 (Fig. 1), subatmospheric pressure is established in the neck mold cavity 2a and the glass charge 6 is pressed downwardly by atmospheric pressure in the mold 1 so as to fill the cavity 2a and form the glass neck ring 6a (Figs. 2 and 3).

It is a further feature of the present invention that the subatmospheric pressure established in the neck mold cavity 2a is at a lower pressure than the air captured or otherwise introduced under atmospheric pressure or greater within the neck pin cavity 5, and the latter mass of air in expanding to the pressure of the glass within the mold counterblows an initial bubble 24 (Fig. 2) in the glass.

Preferably the formation of the initial bubble 24 is the first portion of a single continuous counterblowing operation which is effected substantially concurrently with the suction settling of the charge 6 in the neck mold cavity 2a against the molding surface of the mold 2 and the corkage core or neck pin 4. To that end, the closure or valve member 9 is threaded or otherwise secured at its lower end to the upper end of a piston rod 25 which is guided for vertical movement by a portion of the bore or guideway 8 within the neck pin operating sleeve 7. The rod 25 in conjunction with a suitable force, such as a fluid operated piston (not shown), provides means for raising and lowering the valve stem 14 between the positions shown in Figs. 2 and 3. When the pin 14 is drawn downwardly to its lower position (Fig. 3) it opens the passageway 10 in the neck pin 4. Counterblowing air pressure, which is established in the chamber 8a by supply passage 26 in the piston rod 25 and connecting passages 27 through the member 9 preceding retraction of the pin 14, thereupon passes from the cavity 8a through the passage 10 and completes the counterblowing of the charge 6 into molding engagement with the mold 1 and a baffle plate 28, substantially as shown in Fig. 3.

As shown in Fig. 2, the baffle plate 28 may be secured to an arm 29 or other suitable means responsive to the action of a force, such as a fluid actuated piston (not shown), for moving the baffle into and out of sealing engagement with opening 1b at the top of the inverted mold 1.

The operation of the several forces or motors for individually actuating the baffle operating arm 29, the neckpin operating sleeve 7, and the counterblowing valve rod 25, as well as the other components of the forming machine in which the present invention may be incorporated, preferably are all controlled by a timer, such for example as that disclosed in the Ingle patent. However, for simplicity, the timer has been illustrated in the present drawing merely as a rotating shaft 30 (Fig. 1) on which suitable members such as control cam 31 may be adjustably mounted to effect desired changes in the cycle or pattern of operation of the several components.

As shown in Fig. 1, the cam 31 may consist of two sections 31a, 31b, the parts of which are individually adjustable on the timer shaft 30 for connecting and disconnecting the suction settle line 15 with the constant suction source line 23. Similar or comparable timer members (not shown) may of course be provided on the shaft 30 to control the operation of the other operating components of the machine, including the counterblow control valve 14, the neck pin 4, and the baffle 28.

If reference is made to the Ingle patent for comparison of the apparatus there shown with the apparatus shown in the present drawing and heretofore described, it must be understood that the sleeve member 7 for raising and lowering the member 3 and neck pin 4 corresponds to Ingle's sleeve for operating a thimble, and Ingle's rod for raising and lowering his neck pin corresponds to the present rod 29 for raising and lowering member 9 and its valve stem portion 14.

*Operation*

The operation of the embodiment of the invention heretofore described with reference to the drawing is as follows:

The charge of glass 6 is supplied to the blank mold 1 through its open upper end, the baffle plate 28 being raised and out of alignment with the top opening 1b of the blank mold 1. At this time, the neck pin 4 may be in its raised or operative position, as shown in Fig. 1, and the valve member 9 is at its uppermost position with the passage 10 through the pin 4 preferably substantially blocked by the valve stem 14. There is, therefore, no substantial counterblowing air being supplied through the passage 10 in the neck pin 4 prior to the time the charge of glass 6 is introduced into the mold 1 through the top opening 1b and a volume of air under substantially atmospheric pressure is trapped in the neck pin cavity 5 by the charge 6 (Fig. 1).

At or before the glass charge 6 moves into the mold 1 and the bottom end of the charge comes into engagement with the upper end of the neck pin 4, the valve 22 is actuated by the cam 31 on the timer shaft 30 to connect lines 15 and 23 and thereby establish suction in the neck mold cavity 2a. The suction in the neck mold cavity and the atmospheric pressure on top of the charge 6 in the mold 1 creates a pressure differential which forces the charge into the neck cavity 2a. Simultaneously the mass of atmospheric air captured in the cavity 5 gradually expands thereby progressively forming the bubble 24. This step of the operation is shown in Fig. 2. The gradual expansion of the captured air assures that the glass does not contact with the center portion of the end of the neck pin 4, and further, assures that some stretching of the bubble 24 continually occurs during the initial suction settle so as to minimize skin formation within the bubble during the brief interval that may occur prior to the introduction of counterblowing air from chamber 8a.

In accordance with one embodiment of the invention, a very minute volume of counterblowing air may be permitted to continually bleed into the cavity 5 so as to assure that air is captured therein when the glass charge seats on the neck pin 4.

While the bubble 24 is still expanding, the baffle 28 is moved by the arm 29 to close the opening 1b at the top of the inverted mold 1 and the member 9 is retracted to the position shown in Fig. 3. Thereupon counterblowing pressure in volume is supplied by retraction of pin 14 and flows through the neck pin passage 10 to expand the glass into conformity with the cavity of the mold while suction is maintained on the neck ring. Thereafter the neck pin 4 may be drawn downwardly against the valve member 9 thus relieving the suction and counterblowing pressures on the molded glass parison. It will be understood that retraction of the neck pin causes the valve 14 to close the neck pin passage 10 and prevent further escape of counterblowing air, and that the valve 22 preferably is actuated at this time to block the suction line 23 and prevent unnecessary loss of vacuum pressure. Thereupon the baffle 28 may be removed, the mold 1 opened and the glass parison removed for further forming operations thereby making the blank mold 1 available for a repetition of the heretofore described charge settling and counterblowing cycle.

Undesirable settle wave is virtually eliminated by the described process and apparatus embodying the present invention. Glass charges are settled in the neck ring mold 2 and counterblown in the parison mold 1 substantially concurrently and in a minimum time. "Corkage reheat" time is unnecessary and chokes are avoided in the finish.

Having thus described a preferred embodiment of the invention, I claim:

1. The method of molding a glass charge into a hollow parison within a body mold and a neck ring mold having a hollow ended neck pin located therein which comprises depositing the charge on the neck pin within the neck ring mold under atmospheric pressure, capturing a mass of air beneath said charge and within the hollow end of said neck pin, placing a second and lower pressure between said neck ring mold and pin on said charge within said neck ring mold, said pressure being less than the atmospheric pressure which forces a portion of said charge to fill said neck ring mold and less than the pressure in the hollow of said neck pin, gradually heating and expanding the air within said neck pin to progressively enlarge a bubble in said glass and thereafter introducing counterblowing air through the hollow in said neck pin to expand and counterblow said charge into overall molding engagement with the mold.

2. The method recited in claim 1 and wherein said second pressure is maintained on the glass in said neck mold while said glass is being counterblown.

3. The method of molding a glass charge into a hollow parison within an inverted body mold having a charge receiving opening at the top and an associated neck ring mold at the bottom within which a hollow ended neck pin is located, which comprises dropping the charge through said mold opening onto the neck pin within the neck mold under atmospheric pressure, capturing a specific mass of air beneath said charge and within the hollow end of said neck pin under substantially atmospheric pressure, substantially concurrently establishing a lower pressure beneath said charge and within said neck ring mold and thereby creating in combination with atmospheric pressure a first differential pressure that fills said neck mold with a portion of said charge and concurrently expands said captured mass of air and forms a counterblowing bubble within said charge above said neck pin, closing said top opening of said inverted body mold with a parison bottom baffle, and uninterruptingly continuing to enlarge said counterblowing bubble by the introduction of counterblowing air through the neck pin to expand said bubble and counterblow said charge into overall molding engagement with the mold cavity wall of said body mold and said baffle while maintaining subatmospheric pressure on the glass in said neck mold and atmospheric pressure on the glass beneath the baffle.

4. Apparatus for molding a glass charge into a hollow parison including a neck wing mold, a hollow-ended neck pin located within said neck mold for supporting the charge therein, means including a concave wall forming a hollow in the end of the neck pin for capturing a mass of air beneath said charge and within the hollow end of said neck pin, a valve for opening and closing a passage connecting the hollow in said neck pin with a chamber containing air under superatmospheric pressure for counterblowing, means for establishing subatmospheric pressure beneath said charge and adjacent said pin within said neck wing mold, and means for operating said valve to open said passage while maintaining said subatmospheric pressure.

5. Apparatus for molding a glass charge into a hollow parison including an inverted body mold, a neck ring mold communicating with said inverted body mold at the bottom thereof, a hollow-ended neck pin within said neck mold for supporting the charge therein, means including a concave wall forming a hollow in the end of the neck pin for capturing a mass of air beneath said charge and within the hollow end of said neck pin including an operable valve for opening and closing a passage connecting the hollow end of said neck pin with a chamber containing air under superatmospheric pressure for counterblowing, means for establishing subatmospheric pressure beneath said charge and within said neck ring mold, and means for operating said valve and opening said passage.

6. Apparatus for molding a glass charge into a hollow parison including an inverted body mold having an opening at the top through which to introduce the charge into the mold, a neck ring mold communicating with said inverted body mold at the bottom thereof, a hollow-ended neck pin located within said neck mold for supporting the charge therein, means including a concave wall forming a hollow in the end of the neck pin for capturing a mass of air beneath said charge and within the hollow end of said neck pin including an operable valve for opening and closing a passage connecting the hollow end of said neck pin with a chamber containing air under superatmospheric pressure for counterblowing, means for establishing subatmospheric pressure beneath said charge and within said neck ring mold, a baffle for closing said top mold opening, and means for opening said valve between said counterblowing air chamber and the hollow end of said neck pin while maintaining the subatmospheric pressure on said neck ring mold.

GEORGE E. ROWE.

References Cited in the file of this patent

UNITED STATES PATENTS

| Number | Name | Date |
| --- | --- | --- |
| 744,007 | Proeger | Nov. 10, 1903 |
| 1,680,746 | Peiler | Aug. 14, 1928 |
| 1,911,119 | Ingle | May 23, 1933 |
| 2,063,463 | Rowe | Dec. 8, 1936 |
| 2,091,238 | Gordon | Aug. 24, 1927 |
| 2,142,954 | Rowe | Jan. 3, 1939 |
| 2,142,955 | Rowe | Jan. 3, 1939 |
| 2,198,750 | Winder | Apr. 30, 1940 |